(12) United States Patent
Lloyd

(10) Patent No.: US 6,513,758 B1
(45) Date of Patent: Feb. 4, 2003

(54) HIGH ALTITUDE PLATFORM CONTROL SYSTEM

(75) Inventor: David W. Lloyd, Manhattan Beach, CA (US)

(73) Assignee: Hughes Electronics Corporation, El Segundo, CA (US)

( * ) Notice: Subject to any disclaimer, the term of this patent is extended or adjusted under 35 U.S.C. 154(b) by 113 days.

(21) Appl. No.: 09/644,226

(22) Filed: Aug. 21, 2000

(51) Int. Cl.$^7$ ................................................. B64C 1/00
(52) U.S. Cl. .................. 244/129.1; 244/75 R; 342/359; 342/354; 343/713; 343/705; 343/706
(58) Field of Search ............................ 244/129.1, 75 R, 244/76 R; 342/359, 354; 343/713, 705, 706

(56) References Cited

U.S. PATENT DOCUMENTS

| | | | | |
|---|---|---|---|---|
| 5,790,071 A | * | 8/1998 | Silverstein et al. | 342/354 |
| 5,912,642 A | * | 6/1999 | Coffin et al. | 342/359 |
| 6,014,372 A | * | 1/2000 | Kent et al. | 370/316 |
| 6,150,977 A | * | 11/2000 | Wilcoxson et al. | 342/355 |

OTHER PUBLICATIONS

K. K. Chan, F. Marcoux, M. Forest, L. Martins–Camelo, "A Circularly Polarized Waveguide Array for LEO Satellite Communications", pp. 154–157, IEEE1999 AP–S International Symposium, Jun. 1999.

M. Oodo, R. Miura, Y. Hase, "Onboard DBF Antenna for Stratospheric Platform", pp. 125–128, IEEE Conference on Phased Array Systems and Technology, California, May 21–25, 2000.

Yokosuka Research Park, "The First Stratospheric Platform Systems Workshop", pp 1–216, May 12–13, 1999.

* cited by examiner

Primary Examiner—J. Woodrow Eldred
(74) Attorney, Agent, or Firm—V. D. Duraiswamy; M. W. Sales

(57) ABSTRACT

A method and system for controlling a movable appendage on an aerospace vehicle independent from the position of the aerospace vehicle. First and second beacons containing actual position information for the movable appendage are tracked and acquired by first and second beacon tracking sites. The beacon tracking sites report the azimuth and elevation data relating to the position of the movable appendage to a processor where a correction command is determined based on an error calculated from the position data and a desired position. The correction command is communicated to the movable appendage so that appropriate correction to the desired position can be made.

9 Claims, 2 Drawing Sheets

HIGH ALTITUDE PLATFORM CONTROL SYSTEM

TECHNICAL FIELD

The present invention relates generally to a movable platform or appendage as on an air or space vehicle, and more particularly to a movable platform or appendage that needs to be accurately controlled.

BACKGROUND ART

A reliable communications system depends heavily on the accurate position control of movable platforms or appendages, such as antennas. These movable devices can be mounted on an air or space vehicle, or may be part of a terrestrial system such as an electronically-steered phased array antenna.

In order to provide reliable service, the movable devices must be maintained in certain predetermined, or fixed, positions. This is especially important in air and space vehicles, which are constantly moving and require certain movable devices to maintain relative positions regardless of the motion of the vehicle.

There is a need for a low-cost reliable method of controlling a movable device such as a gimbaled communications platform attached to an unmanned aerospace vehicle.

SUMMARY OF THE INVENTION

It is an object of the present invention to improve the reliability of a communications system. It is another object of the present invention to provide a simple low-cost method for accurately controlling a movable appendage.

It is a further object of the present invention to provide a closed-loop control system for a movable appendage. It is still a further object of the present invention to track the actual position of the device to be controlled and position the device to a desired position.

In carrying out the above objects, the present invention provides a closed-loop control system. Downlink beacons sent from the device being controlled are received by tracking sites on the ground and track the movement of the device. The tracking sites report the device's position information to a computer processor. The processor computes an error that is representative of the actual position of the device from the desired position of the device to be controlled. The computer processor computes a command that is sent back to the device to be controlled to null the error and drive the controlled device to the desired position.

These and other features of the present invention will be better understood with regard to the following description, appended claims, and accompanying drawings.

BEST MODE FOR CARRYING OUT THE INVENTION

Figure 1:
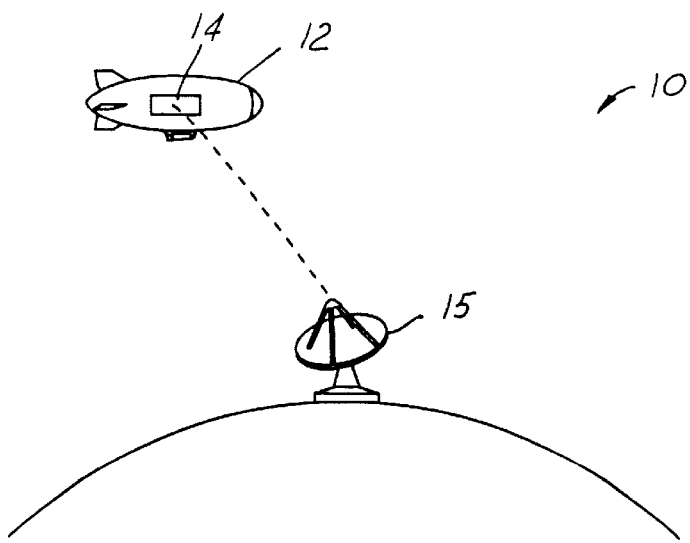
FIG. 1 is an illustration of a communications system that may employ the control system of the present invention.

Referring to FIG. 1 there is shown a communications system 10 that employs a stratospheric aircraft 12 having a movable platform 14. It should be noted that while a stratospheric aircraft and a movable platform are being illustrated and described with reference to the present invention herein, it is possible to apply the control system to other applications as well. For example, the present invention is applicable to any unmanned aerospace vehicle, such as a satellite and any movable device such as an antenna.

Referring still to FIG. 1, the stratospheric aircraft 12 flies in a fixed pattern while the communications platform 14 provides communications service to and from ground based users 15. To provide the service, the communications platform 14 must remain in a fixed position, in three axes, with respect to the ground. The fixed position of the platform 14 is independent of the aircraft's motion.

Figure 2:
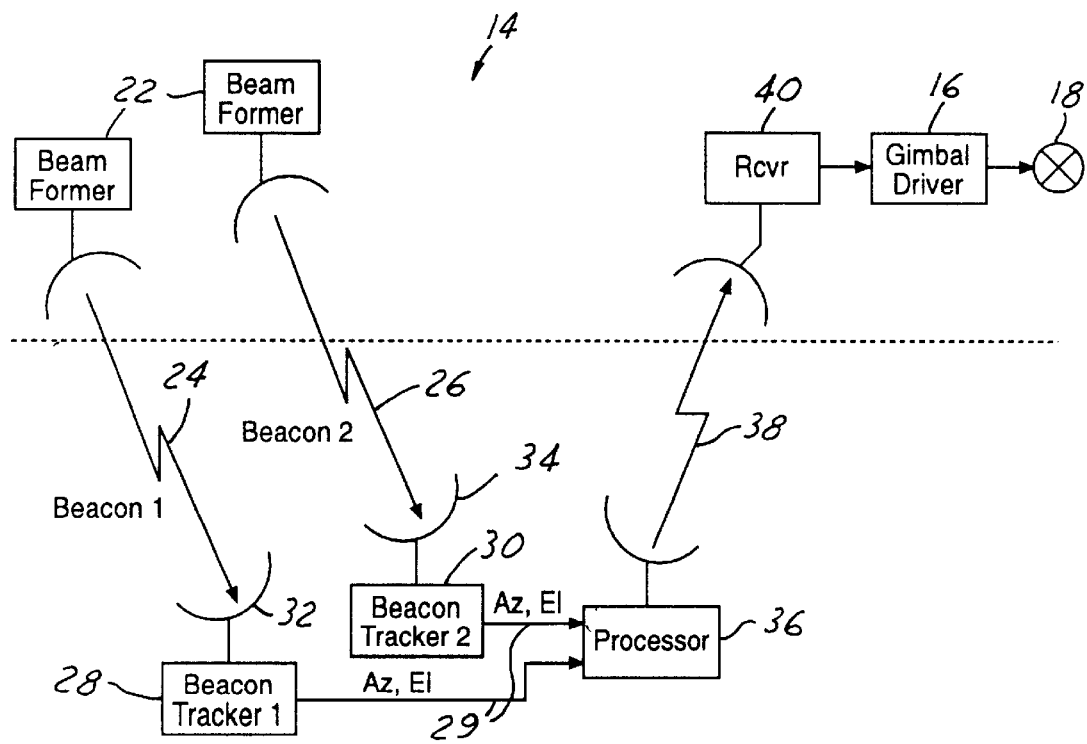
FIG. 2 is a block diagram of the control system of the present invention.

Referring now to FIG. 2 there is shown a block diagram of a stratospheric aircraft platform 14 and a closed-loop control system 20 according to the present invention. The platform 14 has a gimbal driver 16 and three-axis gimbal control 18.

The platform 14 includes a beam former 22 that allocates two beams as first and second downlink beacons 24 and 26. The downlink beacons 24 and 26 are tracked by two beacon tracking sites 28 and 30 on the ground. The platform 14 for a stratospheric aircraft has beam-forming capability 22 as part of its communications service. Therefore, there is no additional complexity required to generate the first and second tracking beacons 24 and 26 on board.

Figure 3:
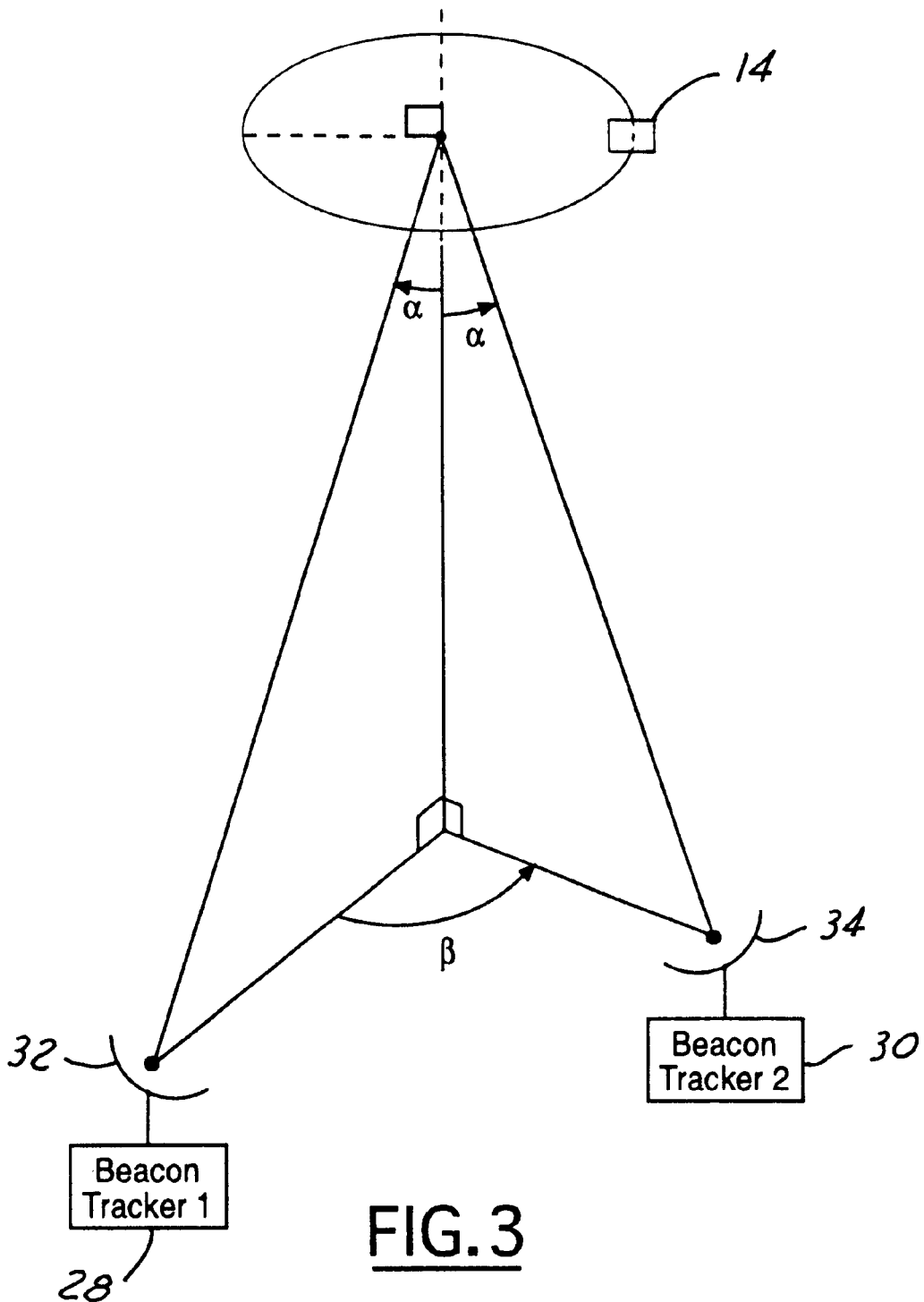
FIG. 3 is a diagram illustrating the positioning for the ground-based tracking sites.

The tracking sites 28 and 30 are geographically located to provide optimal geometry for the control system. The tracking sites 28 and 30 are positioned with a predetermined distance between them in order to enhance the accuracy of the present invention. For example, according to one embodiment of the present invention, the tracking sites are positioned as shown in FIG. 3, where the angle $\alpha$ between the nominal boresight of the tracking station's antenna 32 and 34 and the nominal nadir axis of the platform 14 is a minimum of five degrees, and the angular separation $\beta$ between the first tracking site 28 and the second tracking site 30 is approximately ninety degrees.

Referring again to FIG. 2, the tracking sites 28 and 30 have a gimbaled antenna 32 and 34 in order to acquire and track the downlink beacons 24 and 26. Each tracking site 28 and 30 reports azimuth and elevation data of the platform 14 to a ground based processor 36. The tracking sites 28 and 30 can report data to the processor 36 by way of terrestrial links 29. This allows the sites 28 and 30 to be optimally located and allows the processor 36 to be collocated with other centralized network facilities (not shown).

The processor 36 computes any errors between the actual position of the platform 14 and the desired position of the platform 14. The processor 36 then calculates the commands 38 necessary to null the errors. The commands 38 are transmitted to a receiver 40 where they are sent to the gimbal driver 16, which drives the gimbal 18 thereby adjusting the platform 14 to the desired position.

The present invention does not require any information from the aircraft itself. For example, the position, attitude, rate, etc. of the aircraft are irrelevant to the control system of the present invention. This simplifies the aircraft/platform interface, which can reduce the cost of the overall flight system.

Additionally, it is not necessary to perform attitude control processing on board the platform. All of the processing can be done on the ground utilizing a low cost commercial computer. This significantly reduces the platform weight and complexity, which ultimately reduces the platform cost.

Also, because all of the attitude control processing is done on the ground at the processor 38 instead of on the platform 14, software maintenance is simplified and any modifications and upgrades to the software are easier to perform.

The downlink beacons 24 and 26 provide position feedback. Therefore, there is no need for gyroscopes and attitude sensors on the platform. Nor is there a need for a resolver or other position feedback device on the platform gimbal.

Typically in aerospace applications, uplink beacon tracking designs require beacon tracking arrays, solid-state modular assemblies, and tracking receivers on board the platform. None of this hardware is required for the present invention.

It is noted that the present invention may be used in a wide variety of different implementations encompassing many alternatives, modifications, and variations, which are apparent to those with ordinary skill in the art. Accordingly, the present invention is intended to embrace all such alternatives, modifications and variations that fall within the spirit and scope of the appended claims.

What is claimed is:

1. A method of controlling a position of a movable appendage for an aerospace vehicle having beam forming capability, said method comprising the steps of:

generating a first downlink beacon with said beam forming capability;

sending said first downlink beacon from said movable appendage to a first beacon tracking site on the ground;

generating a second downlink beacon with said beam forming capability;

sending said second downlink beacon from said movable appendage to a second beacon tracking site on the ground, said second beacon tracking site being spaced a predetermined distance from said first beacon tracking site;

extracting actual position information of said movable appendage from said first and second downlink beacons;

sending said actual position information to a processor;

calculating an error between said actual position of said movable appendage and a desired position of said movable appendage;

determining a command necessary to null said error; and sending said command to said movable appendage to move said actual position of said movable appendage to said desired position.

2. The method as claimed in claim 1 wherein said predetermined distance between said first and second beacon tracking sites is set to be ninety degrees.

3. The method as claimed in claim 1 wherein said step of sending actual position information further comprises sending azimuth and elevation data of said movable appendage to said processor.

4. A method of controlling a position of a gimbaled communications platform for stratospheric aircraft having beam forming capability, said method comprising the steps of:

generating a first downlink beacon with said beam forming capability;

sending said first downlink beacon from said gimbaled communications platform to a first beacon tracking site on the ground;

generating a second downlink beacon with said beam forming capability;

sending said second downlink beacon from said gimbaled communications platform to a second beacon tracking site on the ground, said second beacon tracking site being spaced a predetermined distance from said first beacon tracking site;

extracting actual position information of said gimbaled communications platform from said first and second downlink beacons;

sending said actual position information to a processor;

calculating an error between said actual position of said gimbaled communications platform and a desired position of said gimbaled communications platform;

determining a command necessary to null said error; and sending said command to said gimbaled communications platform to move said actual position of said gimbaled communications platform to said desired position.

5. A system for controlling a movable appendage in a communications system to a desired position independent of a motion of the communications system, said system comprising:

an aerospace vehicle;

a movable appendage on said aerospace vehicle;

beam forming on said movable appendage for sending first and second beacons containing actual position information of said movable appendage;

a first tracking site for acquiring and tracking said first beacon;

a second tracking site spaced a predetermined distance from said first tracking site, said second tracking site for acquiring and tracking said second beacon; and a processor in communication with said first and second tracking sites and said movable appendage, said processor receiving actual position information from said first and second tracking sites to calculate an error between said actual position information and a desired position, said error being used by said processor to calculate a correction command that is sent to said movable appendage;

whereby said movable appendage is adjusted to said desired position.

6. The system as claimed in claim 5 wherein said first and second tracking sites are spaced ninety degrees from each other.

7. The system as claimed in claim 5 further comprising gimbal means located on said movable appendage for moving said movable appendage.

8. The system as claimed in claim 5 wherein said processor is located on the ground and communicates by way of terrestrial links between said processor and said first and second tracking sites.

9. The system as claimed in claim 5 wherein each of said first and second tracking sites further comprises a gimbaled antenna for acquiring and tracking said first and second beacons.

* * * * *